June 19, 1962  J. K. O. REMPKA ET AL  3,040,176
HOT BOX DETECTOR
Filed Jan. 25, 1960
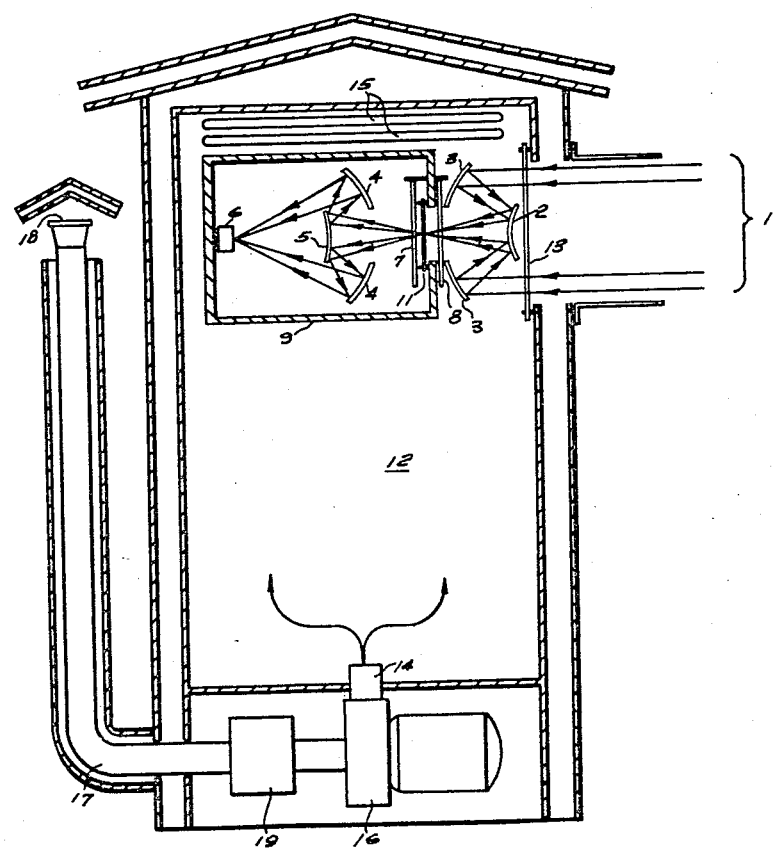

United States Patent Office 3,040,176
Patented June 19, 1962

3,040,176
HOT BOX DETECTOR
Joachim Karl Otto Rempka, Friedrich Eberhard Schmidt, and Friedrich Wilhelm Woltersdorf, all of Braunschweig, Germany, assignors to Siemens & Halske Aktiengesellschaft, Berlin, Germany, a German corporation
Filed Jan. 25, 1960, Ser. No. 4,520
Claims priority, application Germany Jan. 26, 1959
3 Claims. (Cl. 250—83)

This invention relates to the detection of hot journal boxes on railroad cars and more particularly to means for rendering the detection of such hot boxes more accurate and independent of variations in ambient temperature.

Stationary track side equipment has been used to detect hot bearings on railroad cars. In this type of equipment, the same region or portion of each passing journal box or journal box lid is projected onto an infra-red or heat-sensitive receiver, e.g. a photo electric cell, bolometer or thermocouple, by means of an optical system. The receiver generates an electrical signal depending on the radiation intensity of the journal box. To insure obtaining signals the magnitude of which are independent of train speed, and to prevent indication of other heat radiating bodies such as brake shoes, some detectors are equipped with a shutter which opens the optical system synchronously with a passing axle for a predetermined period of time. In other detectors, which use a mechanical chopper such as a rotating disk diaphragm in the optical path, the sample time or period is electronically limited. These prior art devices may in similar way be used to detect hot brake shoes.

It has been found in practice, however, that other factors must be considered in order to obtain reliable hot box detection indications which are obtainable in ample time. For example, the ambient temperature of the journal box, meteorological phenomena such as sun and radiation to which the journal box is subjected, and wind speed and wind direction, must all be considered since they each can have a significant effect upon the temperature of the journal box being tested and therefore on the validity of the indication provided by the detector. With this in mind, hot box detectors have been developed in which the radiation receiver consists of a differential bolometer in a bridge circuit. One bolometer element is exposed to the radiation from the journal box, and the other one to the radiation from a standard body which is subject to the meteorological conditions at the test site. By comparing the indications derived from the passing journal box with the standard, it may be ascertained whether the journal box is in fact excessively hot or whether the indications are merely an accurate representation of the temperatures determined by various ambient conditions. Such a system, however, is quite complex and involves much equipment which may not be feasible for field applications.

In a simpler detector known to the art the standard radiation body and the second bolometer element are replaced by temperature dependent and adjustable bridge resistors, whereby the compensation is provided within the electrical circuit itself rather than relying on external physical objects to provide the standard. This system however requires stabilization of the power supply which, with the bridge circuit required, is expensive.

It is the primary object of this invention, therefore, to provide a hot box detector which automatically compensates for environmental temperature and meteorological conditions utilizing simple and inexpensive equipment.

The above object is accomplished in accordance with the invention by subjecting the optical detection system to a flow of air similar to the ambient air through which the journal box passes at the test site. Means is provided for controlling the temperature of the air forced over the optical sensing equipment so that the temperature of the forced air may be varied from that of the ambient air in accordance with various meteorological effects, e.g. concentrated and direct exposure to the sun or shade therefrom, which may exist over distances along the track prior to reaching the test site.

The objects of the invention and various features and advantages thereof will in part be obvious and will in part appear hereinafter in connection with the detailed discussion of the invention with particular reference to the drawing which is a cross sectional exemplary representation of a hot box detecting system in accordance with the invention.

In greater detail the drawing may be considered to comprise two major sections. The first section is directed to the infra-red sensing equipment which includes optical portions for handling the infra-red radiations from the hot box to be sensed. The second major portion may be considered the housing and ambient temperature controlling equipment. In the discussion to follow the sensing or optical system will first be discussed and then the ambient temperature control equipment and its interrelationship with the sensing system.

Infra-red radiation represented by rays 1 of passing journal boxes is concentrated onto an infra-red receiver 6 through an optical system comprising several elements. The infra-red radiation is transmitted past the opaque side of a mirror 2 onto the reflective concave surface of a mirror designated 3. The mirrors 2 and 3 are coaxially arranged and of such a design that radiations from the hot box which pass by mirror 2 are reflected off the concave surface of mirror 3 onto the convex reflective surface of mirror 2, and thence back through an aperture in mirror 3 into housing 9, forming a reduced image of the target. This occurs if shutter elements 7 and 8 bracketing the aperture and on the inside and outside of enclosure or housing 9, respectively, are open since these shutters control the opening in the aperture. The shutter element 7 may be, for example, a pendulum diaphragm, activated at each passing axle by magnetic or photo electric treadles for a short period during which the part of the axle box to be tested are the only parts being in the receiving angle of the receiver system (that is, the mirror system in combination with the infra-red receiver 6). Diaphragm 7 is located close to the optical image of the journal box surface formed by the mirror elements 2 and 3. Diaphragm 8 will be activated in a manner that it will be opened before the first axle passes and will close after the last axle has passed. The aperture in housing 9 is physically covered by a plastic window 11 between shutters 7 and 8 having excellent infra-red transparency. Mounted within housing 9 are the set of mirrors 4 and 5 having a relationship to each other which is the mirror image of mirrors 2 and 3 on the outside of housing 9. Thus the infra-red optical image projected through the aperture and window 11 impinges on the convex reflective surface of a centrally positioned mirror 5 and is reflected off to the concave surfaces of mirror 4 located coaxially to mirror 5. Energy reflected off the concave face of mirror 4 is thus focused onto infra-red sensitive receiver 6 located at the opposite end of housing 9 from the aperture and window 11.

The use of an optical system with elements 2 and 3 forming a reduced image of the axle box between mirror combination 2 and 3 and mirror combination 4 and 5 has the advantage of keeping the dimension of the aperture and the infra-red transparent window 11, as well as the shutters 7 and 8, to a small dimension. In this way radiation incident on diaphragm 7 through window 11 when diaphragm 7 is closed will not increase the temperature inside the housing 9. In addition, unwanted temperature increase of diaphragm 7 is prevented by the diaphragm 8 external to the aperture and positioned in front of housing 9 and window 11. Diaphragm 8 may properly have a silvered external surface for reflecting any infra-red or heat energy except when a passing axle serves to open both diaphragms 7 and 8.

Considering now the ventilation or temperature control portion, enclosure 9 as well as mirrors 2 and 3 are mounted within a double walled housing 12 which is double walled for the purpose of providing heat insulating properties. Located axially to the aperture of enclosure 9, are two larger apertures in the double wall of housing 12 by which the radiation 1 may enter and impinge upon the mirror system and aperture of enclosure 9. At the bottom of housing 12 and beneath the floor thereof is located a ventilating system comprising a temperature controller 19 which may be a heater or air cooler or a combination of both, whose output proceeds to blower 16 which in turn exhausts into the inside of housing 12. The blower 16 takes air in through an external channel 17 whose inlet 18 is at the same height above the ground as the passing journal boxes. The position of the air inlet 18 is chosen so that the incoming air, and therefore the enclosure 9 within housing 12 and elements 4 to 7 and 11, will have the same temperature as air in the location of the passing journal boxes. The housing 12 is therefore actually an air duct. Infra-red transparent window 13 is located over the opening of the internal wall of housing 12 through which radiation 1 passes. Exhaust slots 15 at the upper portion of the wall of air duct housing 12 serves as the exhaust for the ventilating air coming from inlet 14. In this way enclosure 9 and the sensing and optical equipment therein as well as mirrors 2 and 3 are constantly subject to the flow of air whose temperature is controlled so as to be equivalent to the ambient temperature of air through which the journal boxes pass. The blower 16 takes the air in through channel 17, propels it into air duct 12 through inlet 14 and exhausts it through slots 15.

In operation the optical system performs in the manner now to be described. Heat radiation 1 enters enclosure 12 through infra-red transparent window 13. The radiation is effectively divided between the two mirrors 3, which in turn reflect it back to the convex surface of mirror 2, and thence through the aperture of enclosure 9 and through infra-red transparent window 11. The shutters 7 and 8 had priorly been opened through actuating equipment previously referred to. The radiation on passing through transparent window 11 impinges on the convex surface of mirror 5, and is reflected onto mirror 4, which in turn concentrates the radiation at the infra-red receiver 6. The infra-red receiver, as is well known in the art, will then generate an electrical signal commensurate with the difference between the radiation received during the opened state of the diaphragm and that received during the closed state of the diaphragm. During this entire process the outside of enclosure 9 and the optical elements 2, 3, 11 and 13, as well as the shutters 7 are subject to the forced air from the ventilating system. Because the flow of air on the sensing apparatus and related parts is provided at a temperature equal to the ambient temperature of the hot boxes passing by the electrical signal will be proportional to the difference between the temperature of the hot box and the ambient temperature.

It is useful to blacken the inside of enclosure 9 and everything therein with the exception of the optical parts. Thus all parts inside the enclosure including the shutter-diaphragms 7 and 8 will be at the same temperature because of radiation equilibrium. Diaphragm 8, instead of being located at its indicated position may be located at any other point in the optical path outside of enclosure 9.

The housing or air duct 12 is protected against sun or sky radiation by the double wall provided, in which may be placed heat insulation material (not shown) and may for example be provided with a reflective finish on its external wall.

To compensate for varying effects of sun and sky radiation and/or wind on the temperature of the journal boxes as a result of the journal boxes passing through those conditions prior to arrival at the test site, and for possible compensation of the ambient temperature at the test site itself, the heater and/or air cooler 19 is provided. The temperature controller 19 may be used to vary the temperature of the incoming air and thus the temperature of the air conditioning the enclosure 9 and the optical system. Thus if the test site is surrounded by trees, and the tracks leading to the test site are through an open area, the ambient temperature at the test site will accordingly be higher or lower (depending upon the season) than the average temperature of the air along the track leading up to the test site. By heating or cooling the air taken in through channel 17 at intake 18, the air temperature may be kept equal to the average temperature along the tracks. The temperature controller 19 may act responsively to temperature sensors along the tracks. Similarly, it is possible to take care of different wind conditions at the test site and along the tracks. Furthermore, the temperature controlling sensors or elements may be made dependent on the average trained speed. To achieve this it is not necessary to actually measure the speed of the train; an adjustment may be made to the control elements or sensors based upon the type of train that will be passing at any particular time. Knowing the condition of the track and the terrain and the type of train, the speed to be expected may be anticipated.

To even more completely stimulate within housing 12 the ambient temperature condition that appears at the test site, it may be desirable to only partially insulate the system. Thus, for example, if the hot boxes at the test site would be subject to some specific type of radiation from a particular direction, it may be desirable to remove the insulation from one of the walls of housing 12 so as to better simulate the conditions at the test site.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

We claim:

1. A hot journal box detector comprising an infra-red optical system for focusing radiation from a passing journal box onto an infra-red radiation receiver, a housing enclosing said radiation receiver and at least a portion of said optical system, means for directing a stream of air at said housing to maintain said housing and its contents at a temperature which is equal to the temperature of a journal box in a normal condition, not raised by internal friction, or other irregularities inside the journal box.

2. A combination as recited in claim 1 wherein said means includes a blower and an inlet pipe to said blower, the inlet end of said pipe being located at the same height above ground as that of passing journal boxes to be detected and adjacent the region of the detection site, whereby the temperature of the air into said blower is the same as the ambient temperature of said journal boxes.

3. A combination as recited in claim 2, including an air temperature controlling device, said device being located between the inlet end of said pipe and said blower and arranged to effect the temperature of said air passing to said blower, whereby the effect of meteorological phenomena on the temperature of the journal boxes at a distance from the detector may be simulated by temperature variation of said inlet air.

References Cited in the file of this patent

UNITED STATES PATENTS

| | | |
|---|---|---|
| 2,237,193 | Mobsby | Apr. 1, 1941 |
| 2,493,078 | Mead | Jan. 3, 1950 |
| 2,547,173 | Rittner | Apr. 3, 1951 |
| 2,671,154 | Burstein | Mar. 2, 1954 |
| 2,742,578 | Nicolson et al. | Apr. 17, 1956 |
| 2,818,508 | Johanson et al. | Dec. 31, 1957 |
| 2,917,629 | Andrychuk | Dec. 15, 1959 |